(12) United States Patent
Weaver et al.

(10) Patent No.: US 6,271,523 B1
(45) Date of Patent: Aug. 7, 2001

(54) OPTICAL SENSOR SYSTEM AND METHOD FOR MONITORING CONSUMABLES

(76) Inventors: John D. Weaver, P.O. Box 93415, Las Vegas, NV (US) 89193-3415; Gary Moman, 9457 Las Vegas Blvd., #G, Las Vegas, NV (US) 89123

(*) Notice: Subject to any disclaimer, the term of this patent is extended or adjusted under 35 U.S.C. 154(b) by 0 days.

(21) Appl. No.: 09/520,708

(22) Filed: Mar. 7, 2000

Related U.S. Application Data

(63) Continuation of application No. 08/986,320, filed on Dec. 5, 1997, now abandoned.

(51) Int. Cl.$^7$ .................................................... G08S 23/00
(52) U.S. Cl. ..................... 250/341.8; 250/349; 250/221; 250/577; 250/230; 250/231.13
(58) Field of Search .............................. 250/341.8, 349, 250/221, 577, 230, 231.13

(56) References Cited

U.S. PATENT DOCUMENTS 5,880,464 * 3/1999 Vrionis ................................ 250/230

* cited by examiner

Primary Examiner—Constantine Hannaher
Assistant Examiner—Andrew Israel
(74) Attorney, Agent, or Firm—Foley & Lardner

(57) ABSTRACT

An optical sensor for monitoring a utility meter having a sweep hand indicator that moves over a meter surface of the utility meter. The optical sensor has a single infrared light emitter and two photo diodes detectors. The infrared light emitter is positioned at an angle with respect the meter surface and the sweep hand indicator of the utility meter so that the sweep hand indicator is illuminated from an angle to provide a shadow of the sweep hand indicator. The photo detectors detect changes in the intensity of light reflected on the sweep hand indicator and the background surface as well as the shadow of the sweep hand indicator. The two photo diode detectors are electrically coupled in series but in opposite directions relative to an output node, so as to cancel each other at the output node in normal operation. The passing of the sweep hand indicator changes the signal produced of each of the photo diode detectors at the output node, independently but in opposite directions.

15 Claims, 10 Drawing Sheets

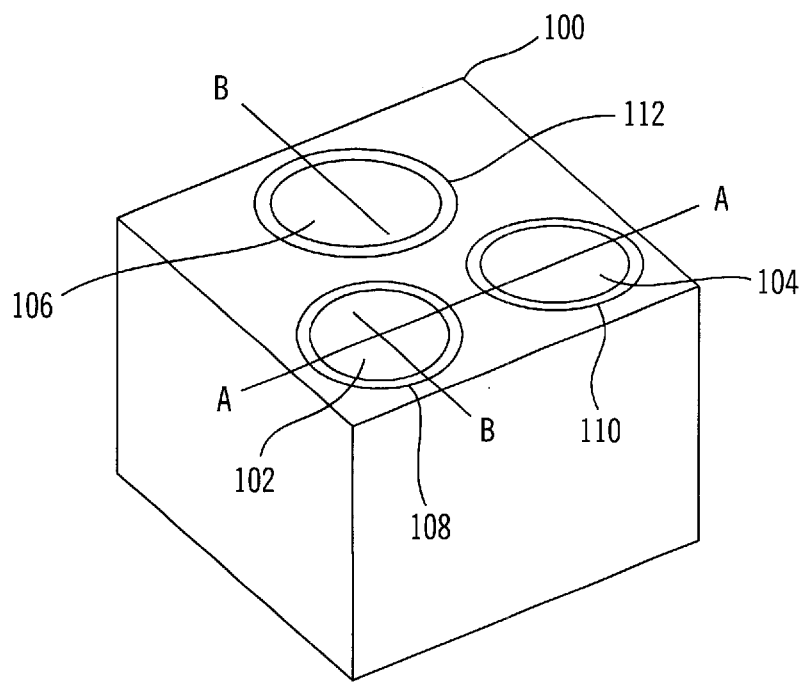
FIG. 6(a)
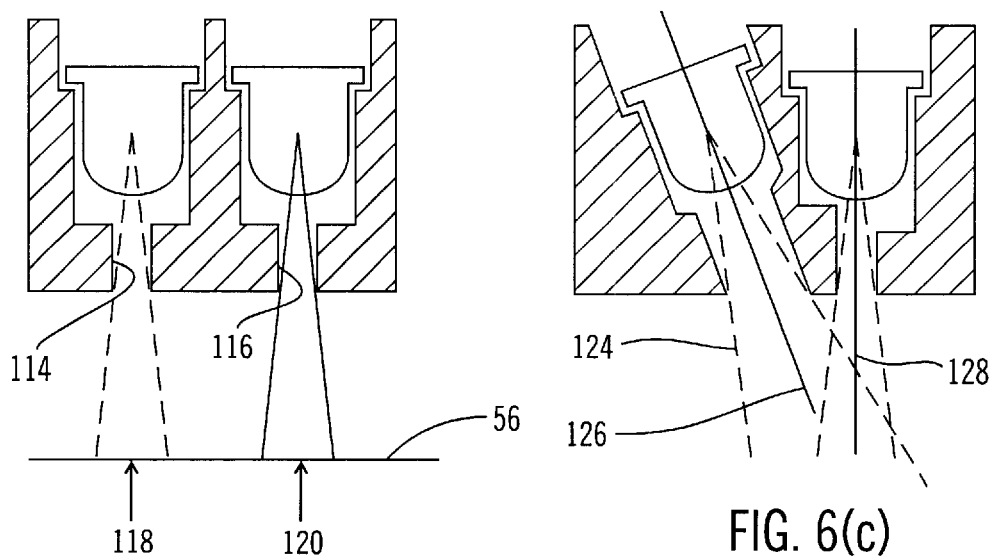
FIG. 6(b)
FIG. 6(c)

OPTICAL SENSOR SYSTEM AND METHOD FOR MONITORING CONSUMABLES

This application is a continuation of 08,986,320 filed Dec. 5, 1997 now abandoned.

BACKGROUND OF THE INVENTION

1. Field of the Invention

Embodiments of the present invention relate to a sensor apparatus, system and process for monitoring the passage of a mechanical device or a target object such as, in preferred embodiments, the motion of a rotating sweep hand indicator of a consumables meter. In preferred embodiments, the consumables meter comprises a sweep hand meter of the type including, but not limited to a water meter, a gas meter, an electric meter or the like.

2. Description of Related Art

The usage of certain consumable materials is often measured and displayed by a sweep hand meter, such as a conventional water meter, gas meter or electricity meter. Utility meters are typically monitored periodically by service personnel (a meter reader) of the respective utility company. Such monitoring practices have typically required utility company personnel to physically visit the location of the utility meter and observe the information recorded by one or more sweep hands of the meter. In many cases, these utility meters are installed within the premise of each household, business, or the like, and are often located at a distance from the public street, or within a gated area where access to the utility meters is encumbered. As a result, such conventional meter reading practices can be problematic, time-inefficient and, in some cases, dangerous for the meter reader.

To address such problems as described above, utility meters with a remote meter reading systems have been developed. A remote meter reading system allows a meter reader to read one or more utility meters from a remote location, thus avoiding the need for a meter reader to enter the premises or location of each utility meter. The remote meter reading system thus improves the efficiency in reading the utility meters and provides the utility company personnel with a safer working environment. However, conventional remote meter reading systems typically require the replacement of conventional utility meters with a monitoring/transmitting device designed to monitor the particular consumable and to transmit consumption readings to a remote location. Such replacement devices can be costly and the installation of such devices may require special electrical, plumbing or mechanical skills.

Another difficulty encountered with prior attempts to remotely read utility meters arises from the fact that the types and manufacturers of utility meters can vary from one household to another household, from one city block to another or from one county to another. Furthermore, utility meters are installed in a variety of diversified environments. For example, the utility meters may be constantly exposed to extremely high or low ambient temperature, or they may be installed outdoors under bright sun light or within a dark enclosed area. Therefore, a system designed for one type of meter or environment of use may not be satisfactory for other meter types or environments.

SUMMARY OF THE DISCLOSURE

It is an object of embodiments of the present invention to provide a remote meter reading system that addresses the above-referenced problems.

It is an object of further embodiments of the present invention to provide such a remote meter reading system that includes apparatus that is readily installed on a conventional utility meter having a sweep hand indicator or a meter needle, without requiring internal modifications of the meter.

It is another object of embodiments of the present invention to provide a sensor system and a method for detecting the motion of a rotating sweep hand indicator of a meter without modifying the internal composition of the meter. In one feature of preferred embodiments of the present invention, a sensor system is easily field installed onto and operated with a wide spectrum of utility meters of different styles from different manufactures under diversified environmental conditions and provides a non-intrusive way to monitor the operation of the utility meters.

It is still another object of the present invention to provide a photo sensor apparatus and an optical sensing method that provides an accurate reading of a utility meter under a variety of background illumination conditions that vary, for example, depending on the position of the sun and other sources of light. In accordance with one embodiment of the present invention, a photo sensor apparatus is attached to a utility meter having a sweep hand indicator which moves adjacent a background surface. The photo sensor apparatus includes one photo emitter, such as an infrared emitter, and at least one, and preferably two photo detectors. In a preferred embodiment, the emitter is positioned to illuminate a portion of the background surface passed by the sweep hand during its motion, to provide a shadow of the sweep hand on the background surface as the sweep hand moves through the illuminated portion. Also, the photo detectors are positioned at an angle with respect to the emitter and define at least one, and preferably two viewing fields on the illuminated portion of the background surface to detect the shadow of the sweep hand indicator of the utility meter as the sweep hand indicator passes through the illuminated portion. In further preferred embodiments, the photo detectors detect changes in the intensity of light reflected on the sweep hand indicator and the background surface as well as the shadow of the sweep hand indicator.

In accordance with further preferred embodiments of the present invention, a photo sensor apparatus, such as described above, includes a single infrared emitter and two photo diodes for detecting infrared light irradiated by the infrared emitter and reflected on the surface of the utility meter on two separated viewing fields. In accordance with one embodiment, the photo diodes are electrically coupled in series and are reversed-biased by a direct current signal. As a result, with respect to the node between the two photo diodes, currents through the two photo diodes cancel each other out when the two diodes are exposed to about equal amounts of light, for example, during the portion of the sweep hand motion in which the sweep hand indicator of the utility meter does not intercept either of the two separated fields. However, when currents through the two photo diodes are unbalanced by the presence of the sweep hand indicator in one of the two fields, the difference is amplified and used as a detection signal for comparison to a threshold value. In further preferred embodiments, as the sweep hand passes through both fields, two oppositely directed difference signal amplitude pulses are generated and compared with two respective threshold values.

In a further preferred embodiment, the light source is positioned at an angle with respect to the background surface and the detector(s), to illuminate the sweep hand from an angle. Since the sweep hand normally passes just above the background surface of the meter face, illuminating from an angle allows the optical detector(s) to observe the passing sweep hand indicator immediately followed by or immediately after its shadow region. If the sweep hand indicator is more reflective than the background surface, the presence of the sweep hand followed by (or after) the sweep hand shadow in a viewing field of a photo diode results in the photo diode generating two oppositely directed amplitude pulses which may be used as a detection signal for comparison with one or two threshold values. Alternatively, in embodiments in which the two photo diodes are coupled in opposite directions to provide a difference amplitude signal, the passage of a sweep hand shadow in the viewing field of one of the photo diodes, followed by the passage of the sweep hand in the viewing field of the other photo diode, provides a difference signal having two oppositely directed amplitude pulses, which may be compared with two respective threshold values.

A method of sensing motion of a sweep hand indicator of a meter which moves above a background surface, in accordance with one embodiment of the present invention, includes the following steps. The background surface and the sweep hand indicator are illuminated with light by a light source. Two separated viewing fields on the background surface are defined by two optical detectors. Background illumination is detected, without illumination from the light source. After a reading of the background illumination value is taken, the light source is activated and further readings are offset by a value associated with the initial background illumination reading. The viewing fields are either continuously or periodically monitored to read the illumination level in each field, offset by the background illumination value. The monitored illumination level in a first viewing field will change when a shadow formed by the sweep hand indicator passes through the viewing field, on the background surface of the meter face. This change in illumination results in a change in the amplitude of the signal produced by one of the two detectors. As the sweep hand proceeds, it will pass through the other viewing field, and result in a change in the amplitude of the signal produced by the other detector. The signal amplitude changes are detected and used to record the passage of a sweep hand. The number of sweep hand detections is recorded and, at an appropriate time, is transmitted to a remote meter reading system. Detection of the shadow region enables stable and correct monitoring of the utility meter in the case where the sweep hand indicator is the same color as the background surface and where ambient illumination is very strong.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like features are designated by like reference numbers in FIGS. 1 through 9.

FIG. 6(a) schematically shows an alignment unit part of an optical sensor unit, in accordance with a second embodiment of the present invention.

FIGS. 6(b) and 6(c) schematically show cross-sectional views of the alignment unit of FIG. 6(a), taken along line A—A and line B—B, respectively, of FIG. 6(a).

DETAILED DESCRIPTION OF PREFERRED EMBODIMENTS

In the following description, reference is made to the accompanying drawings which form a part hereof, and which are shown, by way of illustration, several embodiments of the present invention. It is understood that other embodiments may be utilized and structural chances may be made without departing from the scope of the present invention.

Figure 1:
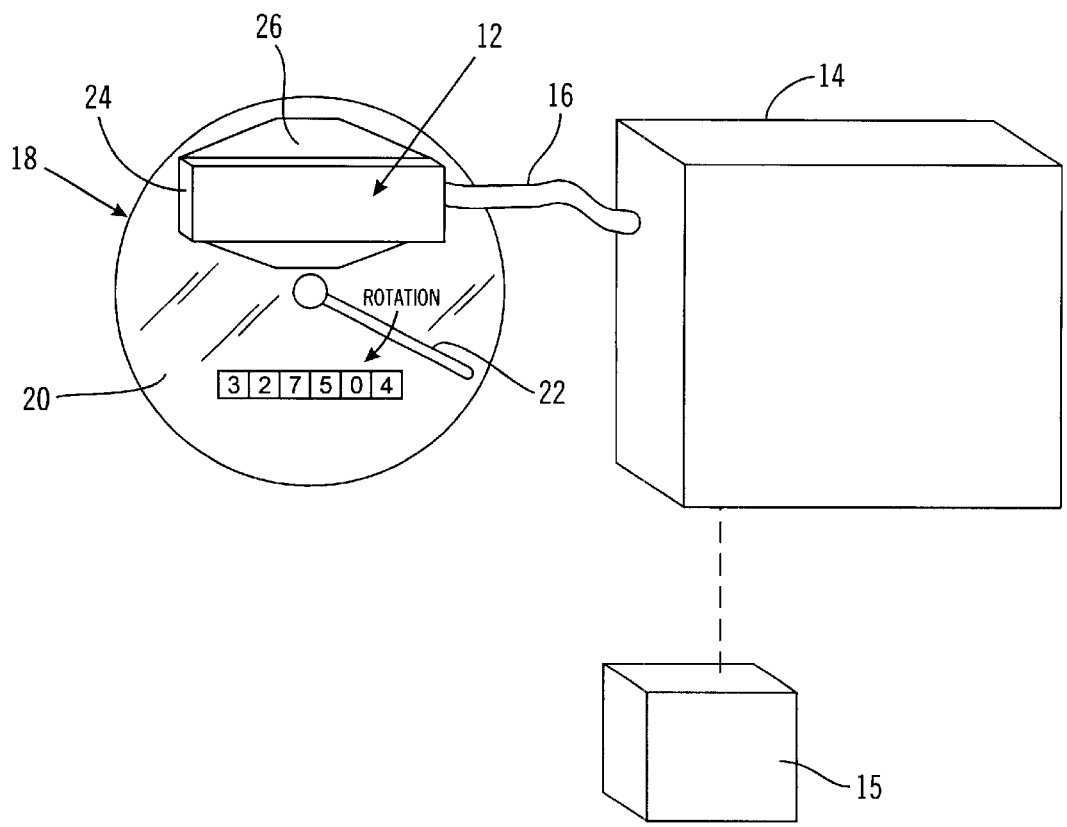
FIG. 1 shows a perspective view of an optical sensor system including an optical sensor unit and an electronic module operatively coupled to an utility meter, in accordance with a first embodiment of the present invention.

FIG. 1 shows an optical sensor system 10 including an optical sensor apparatus operatively coupled to an utility meter 18 and linked in communication with a receiving device 15, in accordance with a preferred embodiment of the present invention. The illustrated optical sensor apparatus includes an optical sensor unit 12 and an electronics module 14, operatively coupled to the optical sensor unit 12 through a cable 16. The optical sensor unit 12 is attached to a utility meter 18, such as, for example, a water meter, a gas meter, an electric meter or the like. Other embodiments employ, for example, other types of consumption meters or volume meters (which indicate, for example, the volume or number of items of a reserve), including but not limited to meters for indicating the amount of a material in a reservoir, the number of items in an inventory, or the like. In preferred embodiments, the utility meter 18 is a conventional utility meter of the type noted above, to which the sensor apparatus is externally attached. However, other embodiments involve utility meters designed with a sensor apparatus during manufacture.

The utility meter 18 generally has a transparent cover 20 over a rotating sweep hand indicator 22. The optical sensor unit 12 is attached to the transparent cover 20 by an appropriate means, such as, for example, adhesive tape, glue, screws or the like. In preferred embodiments, the attaching means is of the type (such as adhesive tape or glue) which requires little or no modification to the utility meter 18. The sensor unit is preferably located relative to the meter cover 20, such that the sweep hand indicator 22 passes under the optical sensor unit 12, once per sweep hand rotation. The optical sensor unit 12 detects the passage of the sweep hand indicator 22 and provides an output signal responsive thereto.

The electronics module 14 houses electronic components that process signals provided by the optical sensor unit 12. In one embodiment, the electronics module 14 includes a wireless transmitting or transmitting/receiving device, such as, but not limited to, a radio frequency device, a microwave device, or the like, for wireless communication with a data receiving device 15. In other embodiments, a communication link between module 14 and device 15 may be a wire, optical or hybrid link. In accordance with a further preferred embodiment of the present invention, the optical sensor unit 12 and the electronics module 14 are constructed in a single unit mounted on the cover 20 of the utility meter 18. In further embodiments, the module 14 may be separate from the unit 12, as shown in FIG. 1, and may be mounted adjacent the meter cover 20.

As shown in FIG. 1, the optical sensor unit 12 includes a generally rectangular housing section 24 and a pair of flange sections 26. The housing section 24 of the optical sensor unit 12 may be formed in a variety of different shapes and is not limited to the rectangular shape shown in the drawings. In the illustrated embodiment, the flange sections 24 define an enlarged surface area adjacent the meter cover 20. In preferred embodiments, the flange sections 26 cover a substantial part of the meter cover 20. As a result, ambient light may be substantially blocked by the flange sections 26 from impinging on the background surface of the meter face, immediately below the housing section 24, to minimize effects of the ambient light on the photo sensing functions. The flange sections 26 also provide an enlarged surface area for maximizing the adhesion surface area between the sensor unit 12 and the meter cover 18. In an alternative embodiment, the flange sections 26 may cover substantially the entire surface of the top cover 20 of the utility meter 18.

Figure 2:
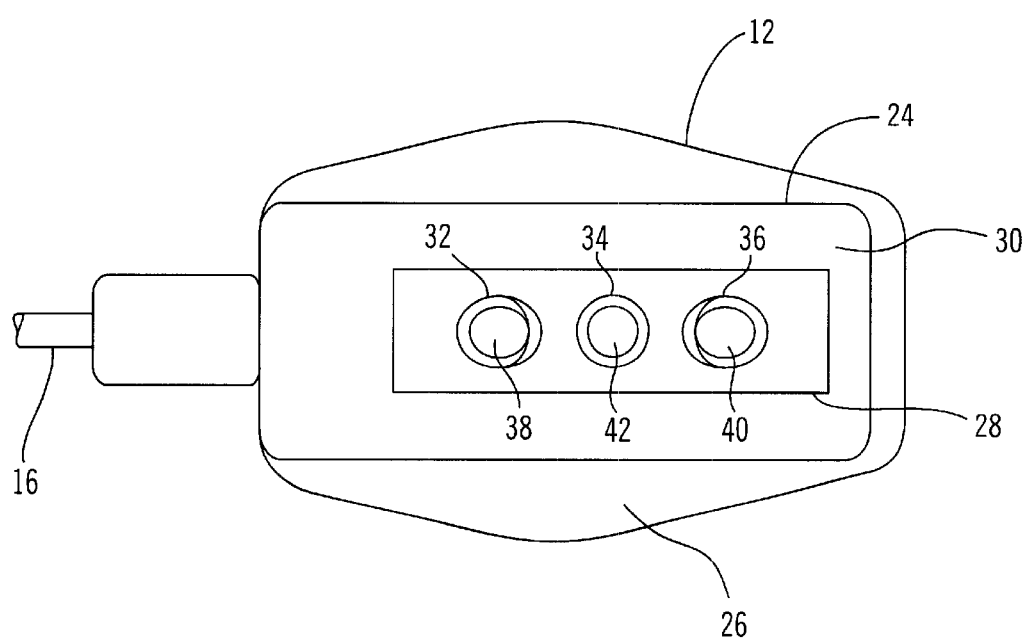
FIG. 2 shows a bottom view of the optical sensor unit of FIG. 1.
Figure 3:
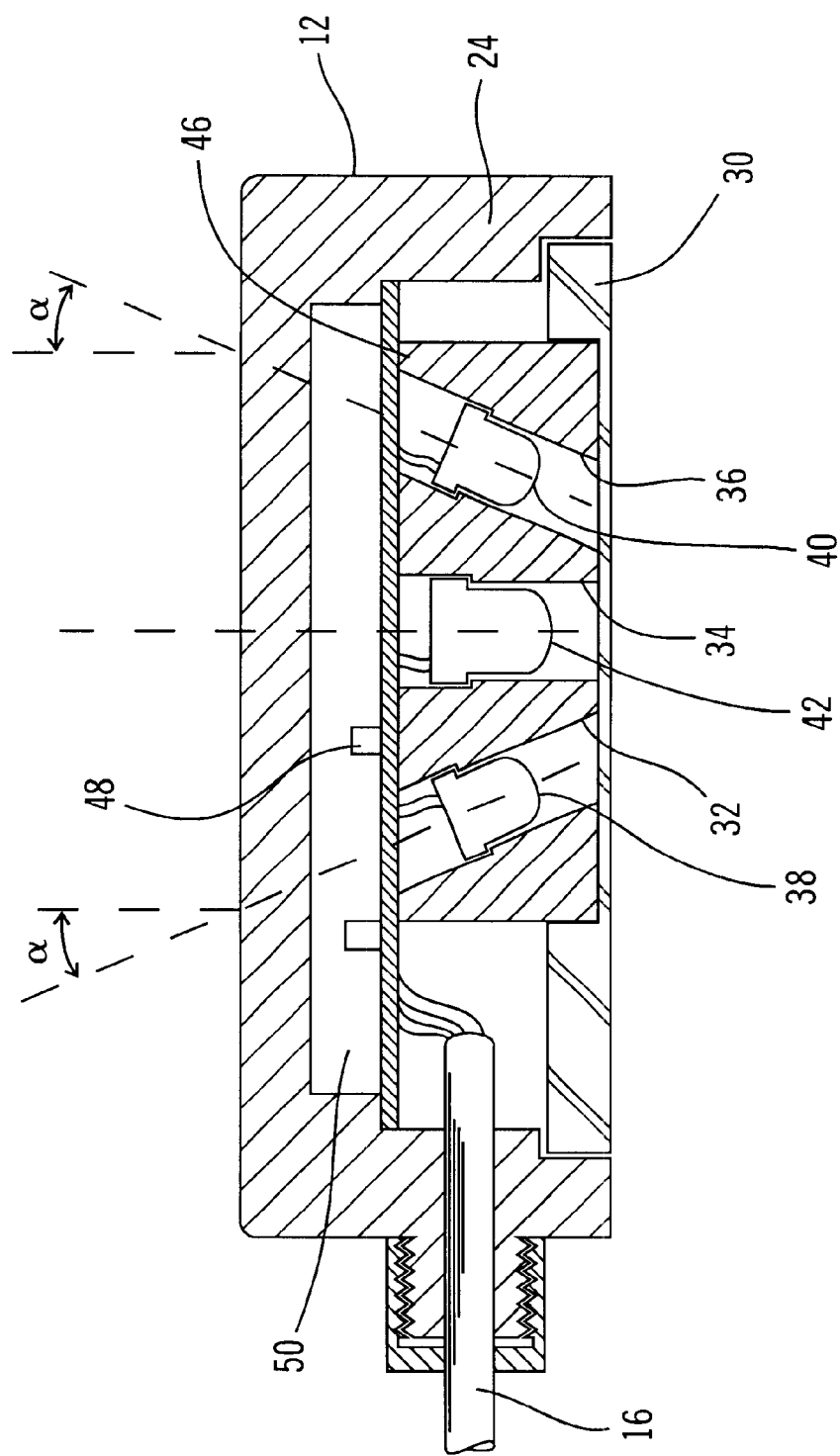
FIG. 3 shows a cross-sectional view of the optical sensor unit of FIGS. 1 and 2 taken along line 3—3 of FIG. 2.

FIG. 2 shows a bottom view of an embodiment of the optical sensor unit 12, and FIG. 3 shows a side view of the FIG. 2 embodiment of optical sensor unit 12, in cross-section. The optical sensor unit 12 includes an alignment unit 28 and a bottom cover 30 that define a bottom surface of the optical sensor unit 12. The bottom cover 30 of the alignment unit 28, is disposed in the housing section 24. The cover 30 may be made of any suitable optically or infra-red transparent material, including, but not limited to glass, transparent plastic and the like.

The alignment unit 28 is made of a suitably rigid and opaque material including, but not limited to, a non-ferrous metal, an alloy (for example, aluminum, brass, and the like) or an infrared opaque plastic. In the illustrated embodiment, the alignment unit 28 has three apertures 32, 34 and 36, which are generally linearly aligned with one another, for retaining a radiation source and two detectors, as described beloew. Further embodiments may employ a single detector and, thus may include two apertures within the alignment unit; one for the source and one for the single detector. With respect to the illustrated embodiment, however, a pair of optical or photo detectors 38 and 40 are housed in the apertures 32 and 36, respectively, and an optical or photo source 42 (which will be described in more detail below) is housed in the central aperture 34. In preferred embodiments, the alignment unit 28 serves at least two functions: first, to maintain balance between the two optical detectors 38 and 40 through correct alignment, and second, to isolate the detectors 38 and 40 from direct illumination by the source 42.

In one preferred embodiment, the detectors 38 and 40 are infrared optical detectors, and the source 42 is an infrared light source. In more preferred embodiments, the source 42 includes a high intensity infrared emitter and the optical detectors 38 and 40 include photo diodes whose operation is inherently linear and generate an electron flow proportional to photons detected. In further embodiments, other forms of radiation emitters and detectors may be used as an alternative to optical emitters and detectors where a detection signal produced by the detectors is proportional to the amount of radiation detected.

When an infrared light source is used as the source 42, the cover 30 is made of a material that is transparent to infrared light and, preferably, is optically smooth so as not to distort or diffuse infrared light illuminated from the light source 42 or reflected from a target object.

As shown in FIG. 3, each of the apertures 32 and 36 defines a respective central axis which is oriented at angle a with respect to the central axis of the central aperture 34. In the preferred embodiment of FIG. 3, the axis of the central aperture 34 is oriented generally at a right angle with respect to the bottom surface of the optical sensor unit 12.

In a preferred embodiment, the alignment unit 28 is detachably mounted in the housing section 24 of the optical sensor unit 12, so that the alignment unit 28 can be readily replaced, for example, to replace a defective or malfunctioning unit or to install another alignment unit having different aperture arrangements. For example, the apertures 32, 34 and 36 of various replacement alignment units may have different shapes and diameters, or the apertures 32 and 36 may be oriented at one of a variety of different angles with respect to the central aperture 34, for optimizing operations with a variety of different meters 18.

As shown in FIG. 3, the light source 42 and the optical detectors 38 and 40 are operatively connected to an electrical cable 16, through a circuit board 46 disposed inside the housing section 24. In the illustrated embodiment, electronic components 48 on the circuit board 46 are housed in a components chamber 50 within the housing section 24. In further embodiments, the optical detectors and/or emitter may be located within the electronics module 14 and the receiving and emitting ends of optical guides, such as optical fibers, may be disposed within apertures 32, 34 and 36, wherein the optical guides extend through the cable 16 to the module 14. In this manner, the circuitry and electronic components within the sensor unit 12 may be minimized or eliminated.

Figure 4A:
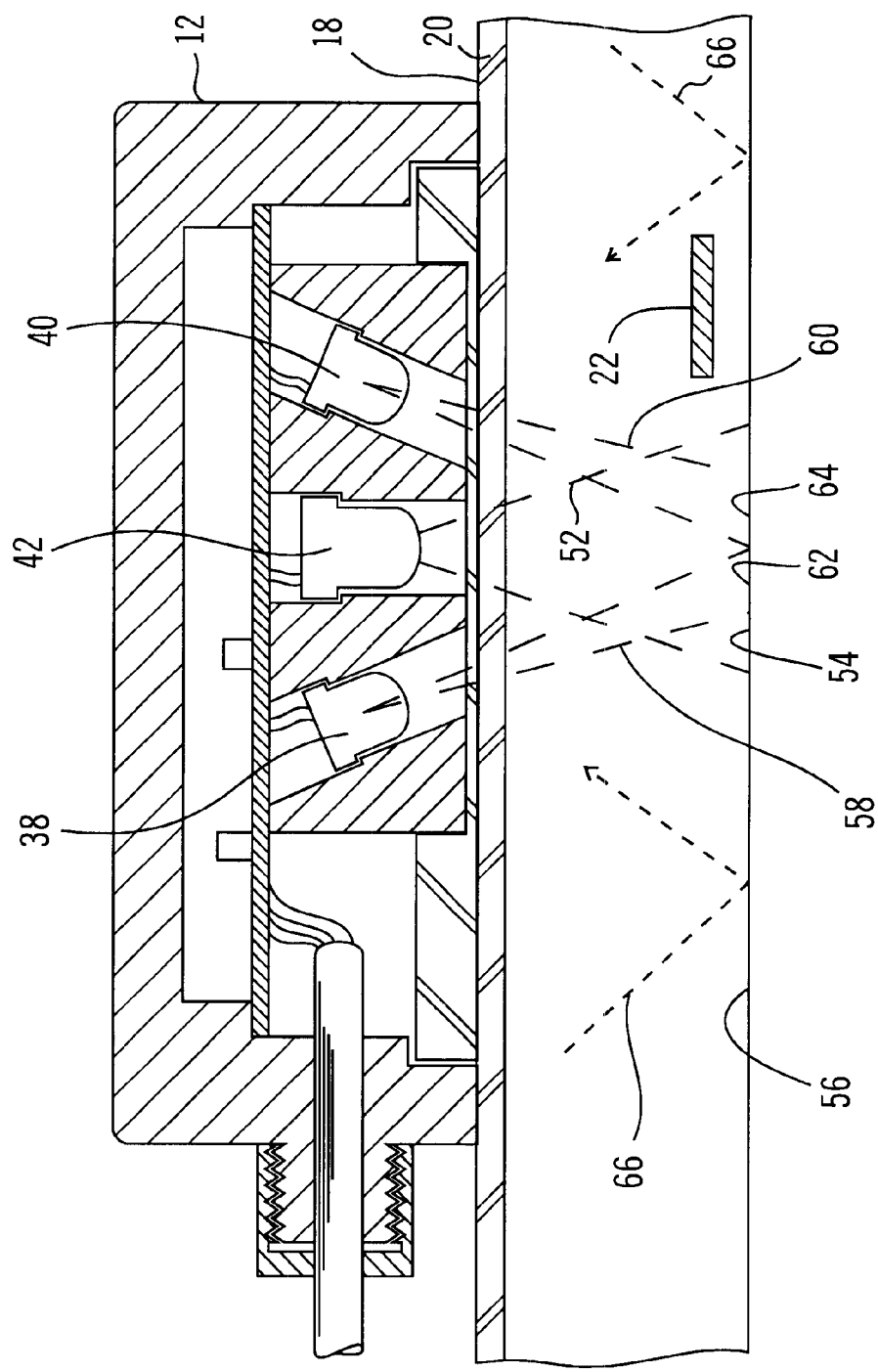
FIGS. 4(a) and 4(b) show a portion of a utility meter and an optical sensor unit in cross-section, where the optical sensor unit is operatively coupled to the utility meter.
Figure 4B:
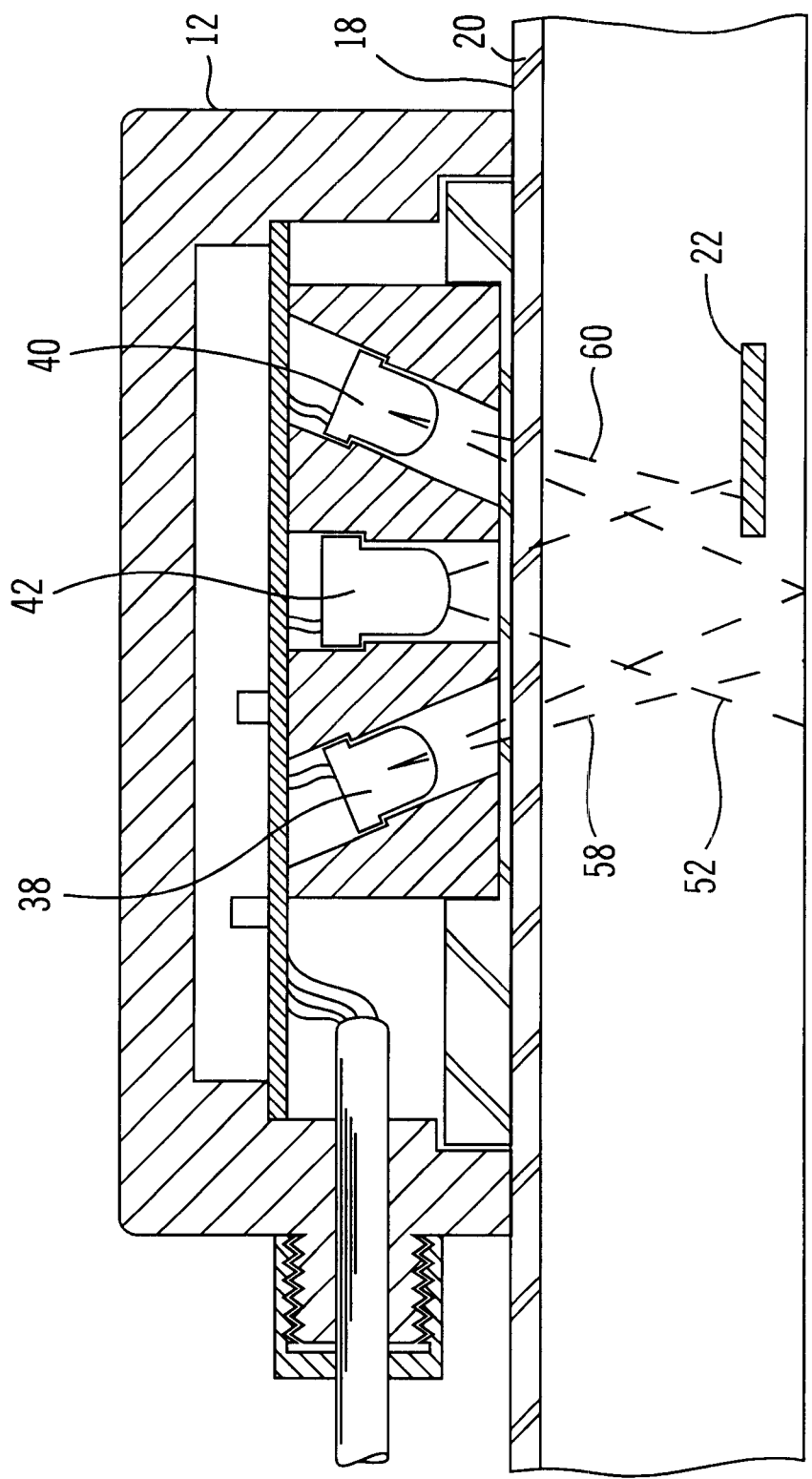

FIGS. 4(a) and 4(b) show the optical sensor unit 12 attached to the transparent cover 20 of the utility meter 18, to detect motion of the rotating sweep hand indicator 22. In this embodiment, an infrared light emitting diode is used as the light source 42 and photo diodes are used as the photo detectors 38 and 40.

As shown in FIG. 4(a), the infrared light emitting diode 42 has an illumination field 52 that illuminates an area 54 on a meter face or background surface 56 of the utility meter 18. The photo diodes 38 and 40 have viewing fields 58 and 60, respectively. The illumination and viewing fields may be defined by the emitter and detector configurations and/or by the configuration of the apertures 32, 34 and 36. Alternatively, or in addition, optical devices, such as lenses, refractors, or the like, may be supported within or adjacent any or all apertures to further define the illumination and/or viewing fields. In a preferred embodiment, the photo diodes 38 and 40 monitor radiation emitted from diode 42 after reflection from the separated meter surface areas 62 and 64 defined by the viewing fields 58 and 60. Background illumination 66 from the sun or other sources of light may also be reflected on the surface of the meter surface 56 toward the photo diodes 38 and 40.

FIG. 4(a) and FIG. 4(b) show the rotating sweep hand indicator 22, at two different locations along its rotation motion, with respect to the viewing fields 58 and 60 of the photo diodes 38 and 40. More specifically, in FIG. 4(a), the sweep hand indicator 22 is at a location outside of the viewing fields 58 and 60. In FIG. 4(b), the sweep hand indicator 22 is shown at another location in its rotation motion, where it interrupts a portion of the viewing field 60 of the photo diode 40. Diodes 38 and 40 provide an output signal dependent on the intensity of the radiation received in their respective viewing fields 58 and 60. Interruption of a viewing field by the sweep hand indicator 22 causes a detectable change in the intensity of the radiation received from the interrupted field.

In one preferred embodiment, the diode-facing surface of the sweep hand indicator 22 is substantially non-reflective so as to significantly reduce the intensity of radiation received from an interrupted field. However, other embodiments may employ sweep hand indicators 22 which have increased reflectivity or any detectably different form of reflectivity relative to the surface of the meter 18.

When a viewing field is interrupted by the sweep hand, the amplitude of the signal provided by the photo diode corresponding to the interrupted field changes, in a detectable manner. Preferred embodiments employ two photo diodes, the outputs of which may be compared with each other or combined, for example, to provide a difference signal, for detecting the passage of the sweep hand indicator 22 through one or each viewing field, as described below. In such embodiments, when neither the viewing field 58 or the viewing field 60 is interrupted by the sweep hand indicator 22, as shown in FIG. 4(a), the photo diodes 38 and 40 provide substantially the same output. When the viewing field 60 of the photo diode 40 is interrupted by the sweep hand indicator 22, and when the viewing field 58 of the photo diode 38 is not interrupted by the sweep hand indicator 22, as shown in FIG. 4(b), the photo diode 40 provides an output signal magnitude which is either smaller or greater than that provided by the photo diode 38.

Figure 5:
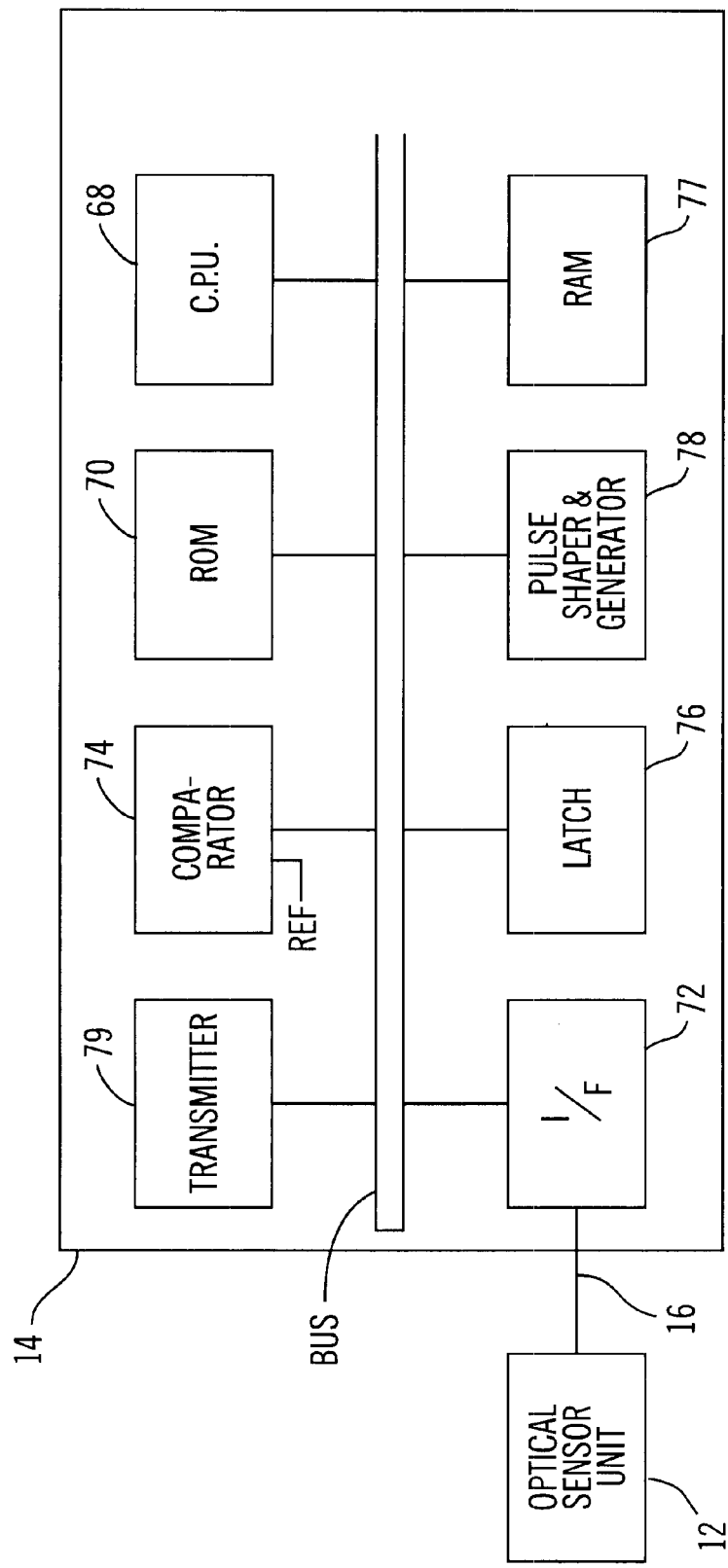
FIG. 5 shows a block diagram of an optical sensor apparatus in accordance with one embodiment of the present invention.

Referring to FIGS. 4(a), 4(b) and 5, the optical sensor system 10 is controlled by a central processing unit (CPU) 68, based on a control program stored in a storage device, such as, for example, a read only memory (ROM) 70. Signals for driving the light emitting diode 42 and signals generated by the photo diodes 38 and 40 are transmitted between the optical sensor unit 12 and the electronics module 14, through an interface (I/F) 72.

In a preferred embodiment, the photo diodes 38 and 40 are connected in series and are reversed-biased. With respect to a signal line connected to the node between the two series-connected diodes, the current signals through the diodes, when substantially equal (for example, might be the case in FIG. 4(a)), cancel each other out. In other words, when the background illumination combined with any illumination from the diode 42 in areas 62 is equal to the combined illumination in area 64 (as would typically occur where areas 62 and 64 are in close proximity to each other and neither field 58 nor field 60 is interrupted by the sweep hand indicator), the photo diodes 38 and 40 provide substantially equal currents, with the result that substantially no difference current is provided on a signal like coupled to the node between the series-connected diodes. When the diode currents are unbalanced by the presence of the sweep hand indicator 22 in one of the fields 58 or 60, a difference signal is provided on the signal line and is amplified for comparison by a comparator 74.

On the other hand, the photo diodes 38 and 40 may generate slightly different signal values for the same light condition or, due to ambient conditions, may define viewing fields that receive mutually different background illumination levels (as might occur if a shadow or light from an external source, such as a passing cloud, falls within one field but not the other), even when the sweep hand is outside of both viewing fields (as shown in FIG. 4(a)). In such cases, a background difference signal reading may be taken, to establish a background difference level, by which further difference signal levels are offset.

The comparator 74 has a reference input REF, with which the amplified photo diode signal or preferably, the amplified difference signal (offset by the background difference signal level), is compared. In preferred embodiments two reference values are provided, for example, high and low. Upon detecting a difference signal which traverses one of the two thresholds, the difference signal is monitored for a subsequent traversal of the other threshold, to ensure the detection of the sweep hand indicator 22 only once each time the sweep hand indicator 22 passes under the optical sensor unit 12. Thus, in preferred embodiments, the difference signal may be processed by the I/F 72 as discussed above and monitored by continuous or periodic comparison with, for example, the high threshold value. Thereafter, the comparator monitors the difference signal for signal values below the lower reference value. This electronic hysteresis results in a "spatial hysteresis" which minimizes false detections (e.g., due to changes in ambient light) and ensures that the sweep hand indicator 22 is not detected multiple times if the sweep hand indicator 22 moves beneath the optical sensor unit 12 very slowly or if the sweep hand indicator 22 has a jitter in its motion.

In preferred embodiments, to conserve power the optical sensor unit 12 (or the light emitting diode 42) is periodically pulsed on for only a few microseconds by a pulse shaper/ generator 78. The rate at which the optical sensor unit 12 is pulsed may vary. In one embodiment, the entire sensor unit 12 is operated by a 3-volt battery, and the optical sensor unit 12 is pulsed four times per second, in other words, at a 4 Hz pulse rate. In such an embodiment, the peak current drawn by the optical sensor unit 12 can be, for example, 0.5 ampere or greater. However the average current may only about 30 micro amperes per second.

A latch 76 stores the state of the comparator from the previous pulse so that the hysteresis can be set correctly before the next pulse. In accordance with one embodiment of the present invention, the latch 76 and the pulse shaper/ generator 78 are implemented on a micro controller (not shown). In another embodiment, the latch 76 and the pulse shaper/generator 78 may be constructed as a discrete logic circuit.

While FIG. 5 shows the interface 72 and comparator 74 as part of the module 14, other embodiments may include these and other circuit components as part of the sensor unit 12. For example, with reference to the embodiment shown in FIGS. 8 and 9, a sensor unit 12 (FIG. 8) includes a light emitting diode (e.g., corresponding to diode 42 described above or diode 106 described below) and two photo diodes (e.g., corresponding to diodes 38 and 40 described above or diodes 102 and 104 described below).

Figure 8:
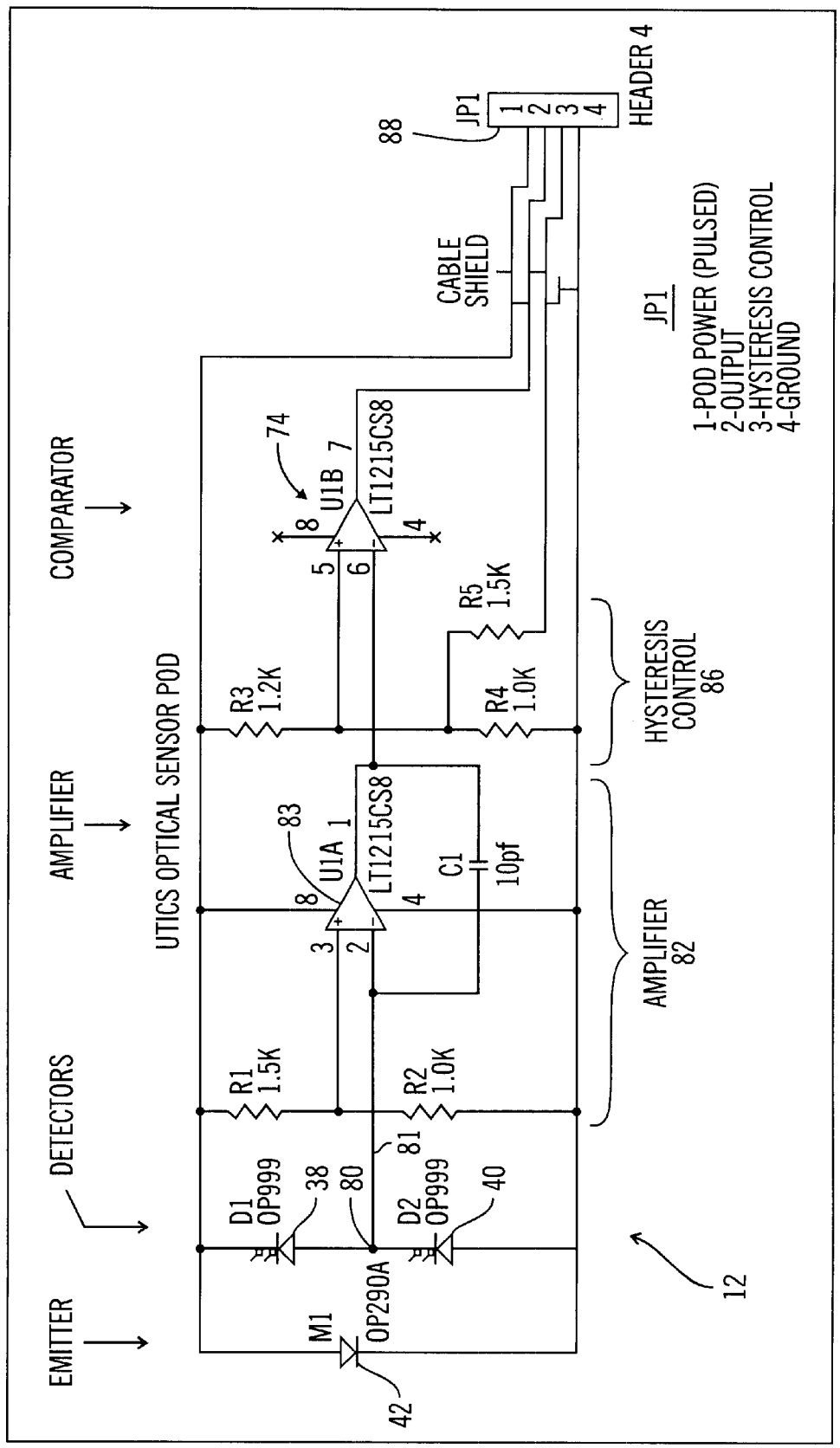
FIG. 8 shows a circuit diagram of an optical sensor unit in accordance with one embodiment of the present invention.

The two photo diodes 38 and 40 shown in FIG. 8 are coupled in series and in opposite directions relative to a center node 80, such that the signal level at node 80 will comprise the signal level provided by diode 38, less (or minus) the signal level provided by diode 40. This difference signal is applied to an amplifier circuit 82 and the amplified difference signal is applied to one input of a comparator 84.

A hysteresis control 86 is coupled to provide appropriate REF signal levels to the other input of the comparator 74.

Figure 9:
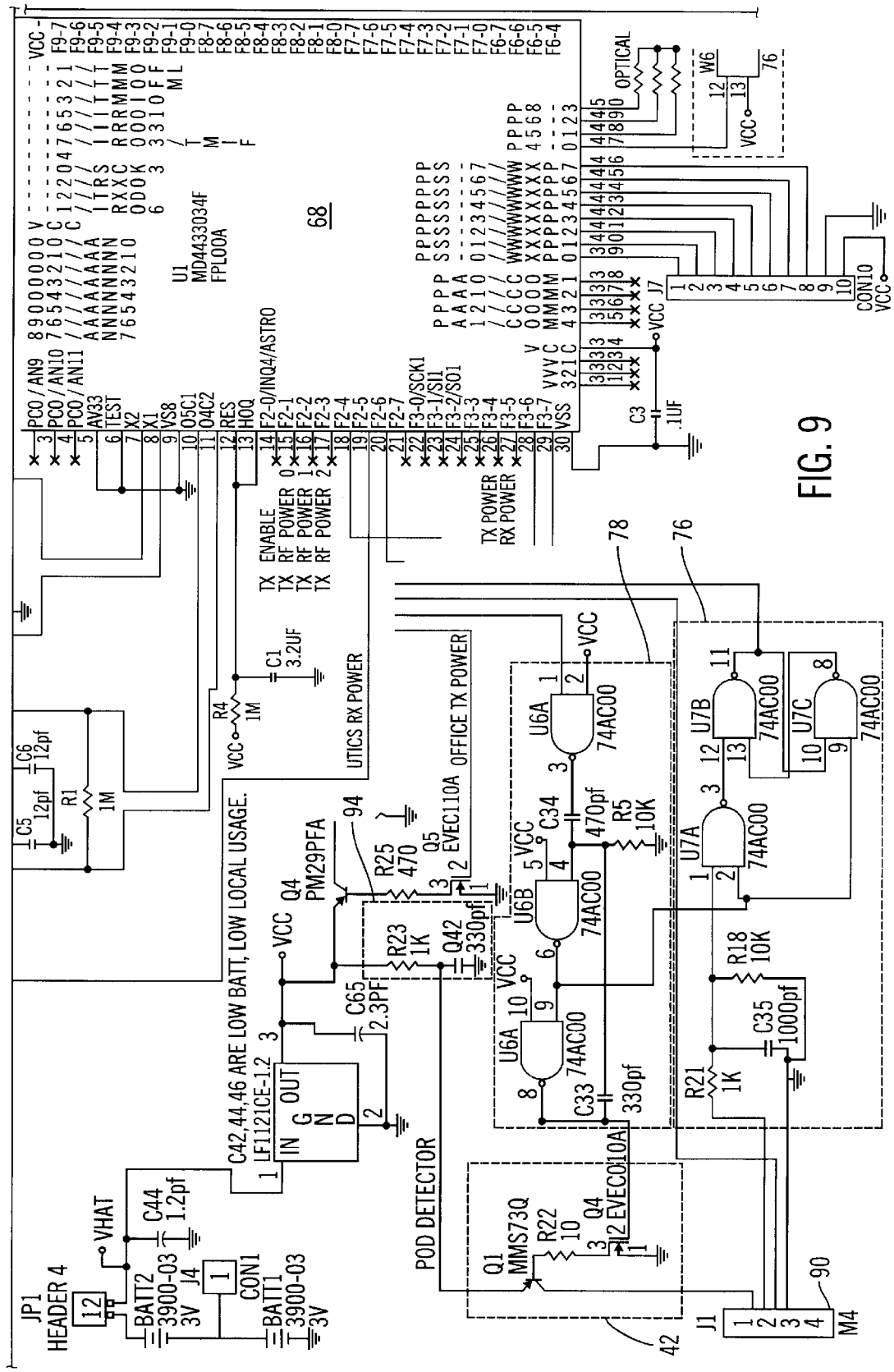
FIG. 9 shows a circuit diagram of an optical sensor system in accordance with one embodiment of the present invention.

A connector 88 couples the sensor unit 12 to electric power through conductors 1 and 4, and to a hysteresis control signal through conductor 3. The output of the sensor unit 12 is provided on conductor 2. As shown in FIG. 9, a corresponding connector 90 couples conductors 1–4 to various circuits within the module 14, including the CPU 68, comparator output latch circuitry 76, pulse shaper circuitry 78, power switch circuitry 92 and power circuit 94. While FIGS. 8 and 9 show one preferred embodiment of various electronics involved in a sensor unit 12 and module 14, other embodiments may implement components shown in FIG. 5 in other suitable manners.

According to a preferred embodiment, as shown in FIG. 8, a positive voltage signal is applied to pin 1 of connector 88, relative to a reference voltage signal at pin 4, to reverse bias the series connected diodes 38 and 40. Because they are reversed-biased, virtually no current (except leakage current) flows through the diodes 38 and 40, when they are not exposed to light. However, when a reversed-biased photo diode is exposed to light, current flows through the diode in the reverse direction—from the cathode to the anode. The amount of current flow is dependent, in part, on the intensity of the light exposure.

In the circuit of FIG. 8, if both diodes 38 and 40 are equally illuminated, current will flow from the positive power terminal (pin 1 of connector 88) to the cathode and out the anode of diode 38, then through node 80, into the cathode and out the anode of diode 40, to the reference or ground terminal (pin 4 of connector 88). In such an equal illumination condition, the current flowing through the diode 38 and toward the node 80 will substantially equal the current flowing from the node 80 and through the diode 40, such that substantially no current flows from the node 80 along a difference signal line 81 to the amplifier 82. Accordingly, substantially no output signal is provided at pin 2 of connector 88.

On the other hand, if the diodes 38 and 40 are unequally illuminated, the reverse currents in the diodes must be different. If diode 38 receives more light than diode 40, then diode 38 will conduct more current than diode 40 and excess current must flow from node 80, through difference signal line 81, to the inverting input of an operational amplifier 83, of the amplifier circuit 82. As a result, a negative voltage signal will be provided at the output of the amplifier.

If diode 40 receives more light than diode 38, then current must flow to the node 80 from the operational amplifier 83, in order to provide this current. The negative current flow (from the amplifier's point of view) will result in the output voltage signal of the amplifier going positive.

The series-connected, reversed biased diode approach, as illustrated and described herein, can be contrasted with typical configurations in which diode currents of individual diodes are separately amplified by individual operational amplifiers before the signals are summed. Such typical configurations tend to have very limited dynamic ranges and may not be able to function with very small currents, such as might occur when the diode is dark, and very large currents, such as might occur if the diode were brightly illuminated, such as by sunlight.

FIG. 6(*a*) schematically shows a part of an optical sensor unit in accordance with a second embodiment of the present invention. For simplicity, only an alignment unit 100, two photo diodes 102 and 104, and an infrared light emitting diode 106 are shown. Other parts and functions of the optical sensor unit may be generally the same as those of the above described embodiments.

The alignment unit 100 has an aperture arrangement that is different from the aperture arrangement of the first embodiment. In the FIGS. 6(*a*)–(*c*) embodiment, the alignment unit 100 has adjacent detector apertures 108 and 110, for housing the photo diodes 102 and 104, respectively. The infrared light emitting diode 106 is housed in an emitter aperture 112 that is provided generally intermediate of the two detector apertures 108 and 110 but off-set from a line connecting the centers of the two detector apertures 108 and 110. In other words, the detector apertures and the emitter aperture 108, 110 and 112 are arranged in a triangle formation.

In a preferred embodiment, the axes of the detector apertures 108 and 110 are arranged in parallel with each other, and the apertures have narrowed sections 114 and 116, respectively. Each of the narrowed sections 114 and 116 restricts each field of view. As a result, when the photo diodes 102 and 104 are placed in the respective detector apertures 108 and 110, the axes of the fields of view of photo diodes 102 and 104 are arranged in parallel and have different view locations 118 and 120 on the meter surface 56 to be monitored, as shown in FIG. 6(*b*). Also, preferably, the photo diodes 102 and 104 are positioned with their axis at or near right angles to the meter surface 56, to minimize the chances of incidental ambient light being reflected into the detector apertures 108 and 110.

Figure 7:
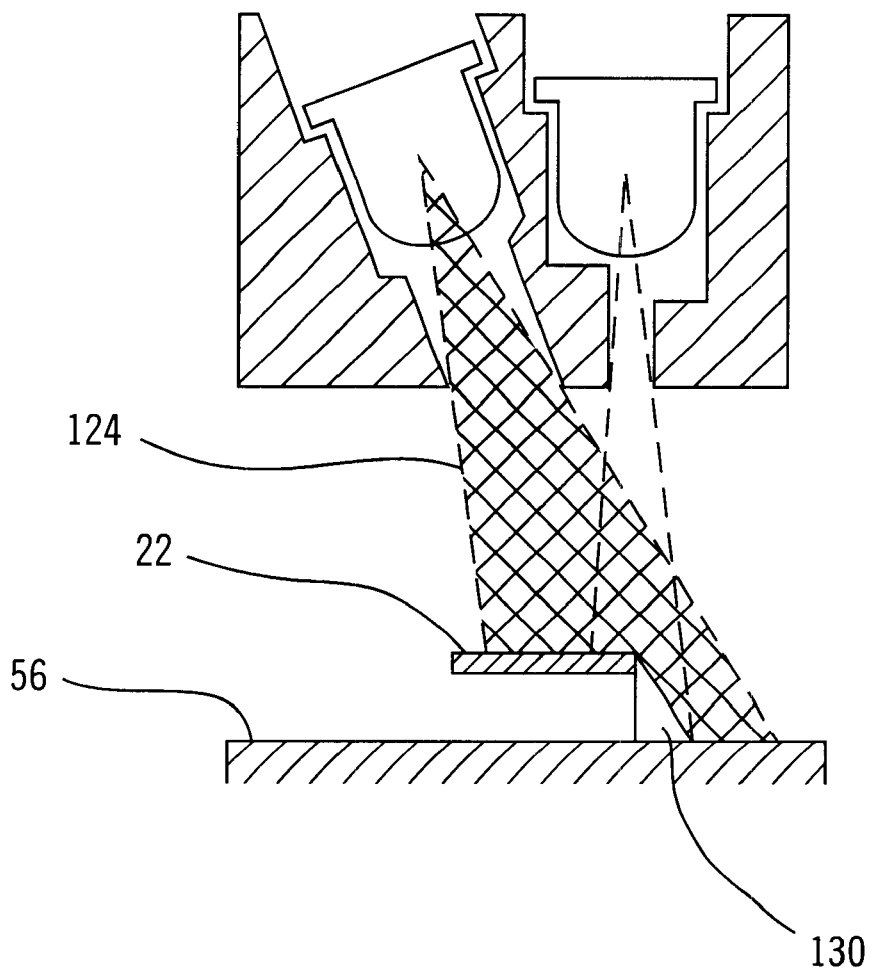
FIG. 7 shows a portion of an utility meter and an alignment unit part of an optical sensor unit in cross-section, where the optical sensor unit is operatively coupled to the utility meter.

The light emitting diode 106 has a field of illumination 124 that illuminates the meter surface 56 viewed by the detector diodes 102 and 104. In a preferred embodiment, the emitter aperture 112 defines a central axis which is oriented at an angle with respect to the axes of the detector apertures 108 and 110. In this manner, when the light emitting diode 106 is placed in the emitter aperture 112, an axis 126 of the illumination field of the light emitting diode 106 is at an angle with respect to an axis 128 of the field of view of each of the photo diodes 102 and 104, as shown in FIG. 6(*c*). In this manner, the meter surface 56 and the sweep hand indicator 22 are illuminated from an angle. Since the sweep hand indicator 22 normally passes just above the meter surface 56 that serves as a background surface for reflecting the illuminated light illuminating from an angle allows the photo diodes 102 and 104 to observe the passing sweep hand indicator 22 and/or a shadow 130 of the sweep hand indicator 22, as shown in FIG. 7.

In the case where the sweep hand indicator 22 has substantially the same reflective qualities as the background meter surface 56, the shadow 130 within a viewing field of a detector diode results in a pulse-like disturbance in the output signal amplitude provided by that diode (for example, relative to the background difference signal amplitude, in embodiments in which the diodes are electrically coupled in opposite directions as described above). This pulse-like disturbance provides a usable detection signal for detecting the passage of a sweep hand. Each sweep hand detection is recorded, for example, as a record of the number of total sweep hand detections, by the CPU 68 in a memory, for example, RAM 77 (FIG. 5).

In the preferred embodiment, two detector diodes, such as diodes 102 and 104, are electrically coupled in series, and are reversed-biased as described above with respect to diodes 38 and 40. With respect to a node between the two series connected diodes, current flowing through a first diode flows toward the node and current flowing through a second diode flows away from the node. In this manner the current flowing through the second diode (away from the node) will, in effect, cancel at least a portion of the current through the first diode (toward the node). The difference between the respective current signals through the two diodes may be taken as a difference signal at the node between the diodes. A sample of the difference signal is taken during ambient operation to provide a background difference signal as described above. The passing of the sweep hand indicator 22 through the viewing fields of the detectors changes the output signal provided by each of the photo diodes 102 and 104(with respect to the background difference signal produced from the ambient illumination conditions) independently but in opposite polarity directions thereby doubling the peak-to-peak amplitude of the resulting disturbances in the combined output signal. The combined output signal, in such an arrangement, may be compared in a two-stage comparison procedure, using high and low threshold values, as discussed above. Moreover, because the detector diodes are connected to substantially cancel ambient illumination effects, the sweep hand detection may occur substantially independent of the ambient illumination condition of the meter 18 and, thus, may be employed in a variety of ambient conditions.

In preferred embodiments, each sweep hand detection is recorded in a suitable memory, such as RAM 77 (FIG. 5), for example, as a tally of the total number of sweep hand detections. Also in preferred embodiments, the module 14 is provided with a transmitter 79 (FIG. 5) for transmitting information recorded in RAM 77, such as the recorded total number of sweep hand detections, to a remote receiver 15 (FIG. 1) for processing. Receiver 15 may be coupled to, or part of, a suitable system (not shown) for processing information received from one or more modules 14 to, for example, prepare billing statements or the like.

The transmitter 79 may be controlled by the CPU 68, for example, to periodically transmit recorded information to the receiver 15. However, in preferred embodiments, the transmitter 79 is actually a transmitter/receiver device which operates to receive polling signals and to transmit recorded information upon receiving an appropriate polling instruction signal. One preferred polling and transmitting process is described in U.S. Pat. No. 5,621,735, assigned to the assignee of the present invention, and incorporated herein by reference. Also, in further preferred embodiments, the transmitter/receiver 79 is capable of receiving control instructions from the remote system, including, for example, resetting instructions, billing information, or the like.

In accordance with one embodiment of the present invention, the optical sensor system 10 functions to monitor the operation of the sweep hand indicator 22 in accordance with the following process.

First, the CPU 68 activates all circuits, except the infrared light emitting diode 42. The CPU 68 samples signals provided by the photo diodes 38 and 40. This operation is intended to measure only "background" infrared radiation without illumination from the infrared light emitting diode 42. If needed, the CPU 68 updates the bias circuit and then repeats the sampling of the photo diodes 38 and 40 described above. A detected sample is taken as a measure of background infrared radiation. Thereafter, the infrared light emitting diode 42 is activated to generate "active" infrared radiation. Then, the CPU 68 samples the signals from the photo diodes 38 and 40, to take a measure of "active+background" infrared radiation. The detected sample, or a value representative thereof, is stored as a measure of "active+background" infrared radiation. The "background" infrared radiation is subtracted from the "active+background" infrared radiation to yield an active signal infrared radiation value.

In one embodiment, the active signal infrared radiation value is monitored over time and compared with a predetermined threshold (or REF) value, wherein a sweep hand presence is detected upon the active signal value traversing the threshold value. However, in preferred embodiments, the active signal excursion is monitored over time to ascertain positive and negative peak signal amplitudes and, then, signal thresholds are established at two levels of the peak-to-peak active signal amplitude value. Alternatively, such thresholds may be predetermined, for example, based on expected detection values. In one preferred embodiment, the signal thresholds are established at 25% and 75% of the peak-to-peak active signal amplitude value. Detection is performed when the signal passes below the 25% point and then rises above the 75% point or vice versa. This minimizes false detections and ensures that the sweep hand indicator 22 is not detected multiple times when the sweep hand indicator 22 moves very slowly or it has jitter in its motion. The stored peak values are updated each time a signal outputted from the photo diodes 38 and 40 crosses the opposing threshold.

In a further embodiment, a change in direction of the varying electrical signal amplitude is monitored, to detect the passage of the sweep hand indicator. From the monitored changes, a table of maximum and minimum values are readily obtained and an algorithm is implemented to determine the presence of the seep hand indicator. Under certain field conditions, a drift or offset in the signal level can occur, for example, if water gets on to a lens and distorts the light path. If the offset were sufficiently large, it would be possible to establish a new threshold value which could not be exceeded after the temporary destabilizing condition passes. Threshold values are preferably determined dynamically, on a continuous basis to account for component drift. However, an abrupt change in levels, such as might occur during flooding, can result in the threshold levels being adjusted in a way from which there is no recovery. By monitoring direction changes instead of signal values, this problem can be avoided.

While the description above refers to particular embodiments of the present invention, it will be understood that many modifications may be made without departing from the spirit thereof. For example, the infrared light emitter 42 in the first embodiment is positioned generally at right angle with respect to the meter surface 56. However, in an alternative embodiment, the infrared light emitter 42 may be positioned at an angle with respect to the meter surface 56. Also, the photo diodes 102 and 104 in the second embodiment are positioned in parallel with each other and at or near right angles to the meter surface 56. However, in an alternative embodiment, the photo diodes 102 and 104 may be positioned at an angle with respect to the meter surface. The accompanying claims are intended to cover these and other modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of sensing motion of a sweep hand indicator of a meter which moves adjacent a background surface, the method comprising the steps of:

illuminating the background surface and the sweep hand indicator by an illumination source;

detecting illumination levels at two separated areas on the background surface by two detectors; and forming a shadow under the sweep hand indicator upon illuminating the background surface and the sweep hand indicator;

wherein said step of detecting illumination levels comprises detecting the shadow under the sweep hand indicator by at least one of the two detectors.

2. A method as defined in claim 1, wherein said step of illuminating, comprises the step of illuminating the background surface and the sweep hand indicator from a non-orthogonal angle with respect to the background surface and the sweep hand indicator.

3. A method as defined in claim 1, wherein said step of detecting illumination levels comprises detecting illumination levels at two separated areas in the background surface from a non-orthogonal angle with respect to the background surface and the sweep hand indicator.

4. A method as defined in claim 1, further comprising the step of:

providing the detectors in series connection with each other and with a detector output node located between the two detectors;

wherein said step of detecting illumination comprises generating an electrical signal with each detector dependent upon the illumination level in said two separated areas on the background surface, combining the signals generated by said detectors at said detector output node, and comparing the combined signal to a predetermined threshold.

5. A method as defined in claim 1, wherein said step of illuminating comprises the steps of energizing a light emitting diode to emit light and directing light emitted by said light emitting diode onto said two separated areas on the background surface.

6. A method as defined in claim 1, wherein said step of illuminating comprises the steps of energizing an infrared-light emitting diode to emit infrared radiation and directing said infrared radiation onto said two separated areas on the background surface.

7. A method of sensing motion of a sweep hand indicator of a meter which moves adjacent a background surface, the method comprising the steps of:

illuminating the background surface and the sweep hand indicator by an illumination source defining an illumination field having an axis, the axis of illumination field being positioned at a non-orthogonal angle with respect to the background surface;

detecting illumination on the background surface by two photo diodes, each defining a field of view having an axis, the axis of field of view of the two photo diodes being positioned substantially in parallel with each other to detect illumination in two separated background surface areas illuminated by the illumination source;

forming a shadow under the sweep hand indicator upon the sweep hand indicator moving across at least one of said fields of view and upon illumination by the illumination source; and detecting at least the shadow under the sweep hand indicator by at least one of the two detectors.

8. A method of claim 7, wherein said illumination source comprises an LED.

9. A method as defined in claim 7, further comprising the step of:

providing the diodes in series connection with each other and with a diode output node located between the two diodes;

wherein said step of detecting illumination comprises generating an electrical signal with each diode dependent upon the illumination level in said two separated areas on the background surface, combining the signals generated by said diodes at said diode output node, and comparing the combined signal to a predetermined threshold.

10. A meter reading apparatus to be attached to a utility meter, the apparatus comprising:

an infrared emitter;

at least two photo diodes having detection fields being oriented at two separated areas for detecting light in the two separated areas illuminated by the infrared light emitter, wherein the at least two photo diodes are electrically connected in series with each other and with an output node located between the two diodes; and a comparison circuit having a first comparison input electrically coupled with the output node and a second comparison input electrically coupled with a reference value circuit.

11. Apparatus as defined in claim 10, further comprising:

a housing;

an alignment unit disposed within the housing, for mounting thereon the infrared emitter and the at least two photo diodes; and means for mounting the housing to the utility meter.

12. Apparatus as defined in claim 11, wherein the utility meter includes an infrared transparent cover and wherein said means for mounting comprises means for securing the housing to the external surface of the utility meter cover.

13. Apparatus as defined in claim 10, wherein the at least two photo diodes are positioned substantially in parallel with each other and the infrared emitter is positioned at an angle with respect to the at least two photo diodes.

14. A system for remotely detecting the consumption of a consumable, the apparatus comprising:

a utility meter having a meter surface and a sweep hand that moves above the meter surface at a rate dependent upon the consumption of a consumable;

an infrared emitter defining an illumination field having an axis oriented at an angle with respect to the meter surface;

two photo diodes, each defining a respective detection field having an axis, the detection fields being oriented at two separated areas within the illumination field on the meter surface for detecting infrared illumination in the two separated, wherein the two photo diodes are electrically connected in series with each other and with an output node located between the two diodes; and a comparison circuit having a first comparison input electrically coupled with the output node and a second comparison input electrically coupled with a reference value circuit.

15. A system as defined in claim 14, wherein said utility meter has an outer cover which is transparent to infrared illumination, the system further comprising:

a housing mounted to the external surface of the transparent cover;

an alignment unit disposed within the housing, said alignment unit containing said infrared emitter and photo diodes.

* * * * *